United States Patent [19]
Ernest et al.

[11] Patent Number: 5,743,985
[45] Date of Patent: Apr. 28, 1998

[54] METHOD OF MAKING AN ASPHALT AND FIBER LAMINATED INSULATION PRODUCT

[75] Inventors: Frederick R. Ernest, St. Louisville, Ohio; Jeffrey J. Van Sloun, Aiken, S.C.; Charles R. Weir, Westerville, Ohio

[73] Assignee: Owens-Corning Fiberglas Technology, Inc., Summit, Ill.

[21] Appl. No.: 742,191

[22] Filed: Oct. 31, 1996

[51] Int. Cl.[6] ................................................. B32B 31/20
[52] U.S. Cl. .................... 156/243; 156/62.2; 156/245; 156/309.6; 156/309.9; 264/112; 264/DIG. 32
[58] Field of Search ........................... 156/62.2, 243, 156/245, 309.6, 309.9, 308.2; 264/112, 113, DIG. 32

[56] References Cited

U.S. PATENT DOCUMENTS

| | | |
|---|---|---|
| 2,701,777 | 2/1955 | Farris . |
| 2,712,506 | 7/1955 | Farris . |
| 2,771,387 | 11/1956 | Kleist et al. . |
| 3,684,645 | 8/1972 | Temple et al. . |
| 3,800,016 | 3/1974 | Roberts . |
| 3,805,601 | 4/1974 | Stapleford et al. . |
| 4,131,664 | 12/1978 | Flowers et al. . |
| 4,133,932 | 1/1979 | Peck . |
| 4,166,752 | 9/1979 | Marzocchi et al. . |
| 4,273,685 | 6/1981 | Marzocchi et al. . |
| 4,285,734 | 8/1981 | Marzocchi et al. . |
| 4,287,263 | 9/1981 | Woodring et al. . |
| 4,333,866 | 6/1982 | Uffner . |
| 4,349,590 | 9/1982 | Bolen et al. . |
| 4,405,680 | 9/1983 | Hansen . |
| 4,506,060 | 3/1985 | White et al. . |
| 4,536,911 | 8/1985 | Demetriades . |
| 4,764,420 | 8/1988 | Gluck et al. . |
| 5,094,318 | 3/1992 | Maeda et al. . |
| 5,240,527 | 8/1993 | Lostak et al. . |
| 5,326,797 | 7/1994 | Zimmerman et al. . |
| 5,472,776 | 12/1995 | Gallagher et al. . |
| 5,494,728 | 2/1996 | Vermilion et al. . |

Primary Examiner—Michael W. Ball
Assistant Examiner—Sam Chuan Yao
Attorney, Agent, or Firm—C. Michael Gegenheimer; Curtis B. Brueske

[57] ABSTRACT

A method of forming an insulation product includes heating a thermoplastic material to a softened condition, and applying the thermoplastic material to a blanket of fibrous insulation material to form a laminated insulation material comprising a layer of the thermoplastic material bonded to the fibrous insulation material. The laminated insulation material is heated to soften it and molded to form it into a desired shape, and the molded laminated insulation material is cooled to form an insulation product.

18 Claims, 4 Drawing Sheets

METHOD OF MAKING AN ASPHALT AND FIBER LAMINATED INSULATION PRODUCT

TECHNICAL FIELD AND INDUSTRIAL APPLICABILITY

This invention relates in general to making insulation products of fibrous materials. The invention also relates to a method for molding insulation material to make a thermal or acoustical insulation product. The invention is useful for making such products as acoustical and thermal insulation for office panels, appliances, automotive applications, and heating, ventilating and air conditioning equipment.

BACKGROUND OF THE INVENTION

Fibrous acoustical insulation products are commonly used in various applications to prevent unwanted sound from escaping from a noise-producing device, such as a motor, machine or appliance. Fibrous thermal insulation products have also been used to block undesirable heat transfer from buildings, industrial equipment and appliances. Also, fibrous insulation material has been used in structural applications for such applications as duct board.

When manufacturing thermal and acoustical insulation products from fibrous materials, a typical component is an organic binder, usually a urea phenol formaldehyde binder, to bond the fibers together where they intersect each other. When the thermoset binder is cured, the product has stiffness and integrity sufficient for the product design. For example, light density building insulation having a density of about 0.5 pounds per ft$^3$ (8 kg per m$^3$) typically has about 5 percent by weight binder, whereas a stiffer product such as a rigid duct board or pipe insulation with a density of about 10 pounds per ft$^3$ (160 kg per m$^3$) typically has 20 percent or more binder by weight.

A typical form of acoustical insulation is a layer of mineral fiber insulation, such as fiberglass insulation, wrapped around or positioned around the source of unwanted noise. It is known that the glass fibers absorb some of the sound energy entering the fiberglass insulation. Further, it is known that the insertion of a reflecting sound barrier within the acoustical insulation also reduces the sound transmission through the insulation product. Reflecting sound barriers in the past have been made of paper and also of a thin layer of polymeric material, as well as of other materials. A recent development to reduce the cost of acoustical insulation products includes using a layer of asphalt as the reflecting barrier, and in some cases using the adhesive quality of the asphalt for laminating two fibrous insulation layers together. Asphalt is a thermoplastic material that is quite inexpensive compared to most polymeric materials, and can be easily applied to the fibrous insulation.

Many fibrous thermal and acoustical insulation products are produced in their final, rigid form by molding the product in a mold which typically applies heat and pressure to cure the organic binder on the fibers. This locks the fibers into a generally fixed or set arrangement. Pipe insulation, for example, can be continuously made by passing a blanket of uncured glass wool fibers continuously over a mandrel and through a mold, and forcing hot curing air through the blanket. Pipe insulation can also be molded in a batch press. Other commonly molded fibrous products are automobile headliners and hoodliners.

One of the problems with traditional fibrous molding processes is that the molds tend to require large amounts of energy and expensive dies. Further, the molding times are often lengthy, thereby contributing to an overall high manufacturing cost of the product. An additional problem is that the binder in traditional fibrous molding media products generally has a short shelf life. Typically, the fibrous molding media must be kept in a cool, high humidity environment to avoid premature setting or curing of the binder before the media is molded into the desired shape and density. Even under ideal conditions, a typical shelf life is less than 30 days.

It would be advantageous if a method could be developed to reduce the length of time required to produce a molded fibrous acoustical or thermal insulation product. Such a process would preferably use a limited amount of equipment for the molding, and would save energy compared with traditional molding processes. More preferably, such a process would solve the short shelf life problem which plagues conventional molding media technology.

SUMMARY OF THE INVENTION

The above object as well as other objects not specifically enumerated are achieved by a method of forming an insulation product which includes heating a thermoplastic material to a softened condition, and applying the thermoplastic material to a blanket of fibrous insulation material to form a laminated insulation material of a layer of the thermoplastic material bonded to the fibrous insulation material. The laminated insulation material is heated to soften it and molded to form it into a desired shape, and the molded laminated insulation material is cooled to form an insulation product.

DETAILED DESCRIPTION AND PREFERRED EMBODIMENTS

Figures 1, 2:
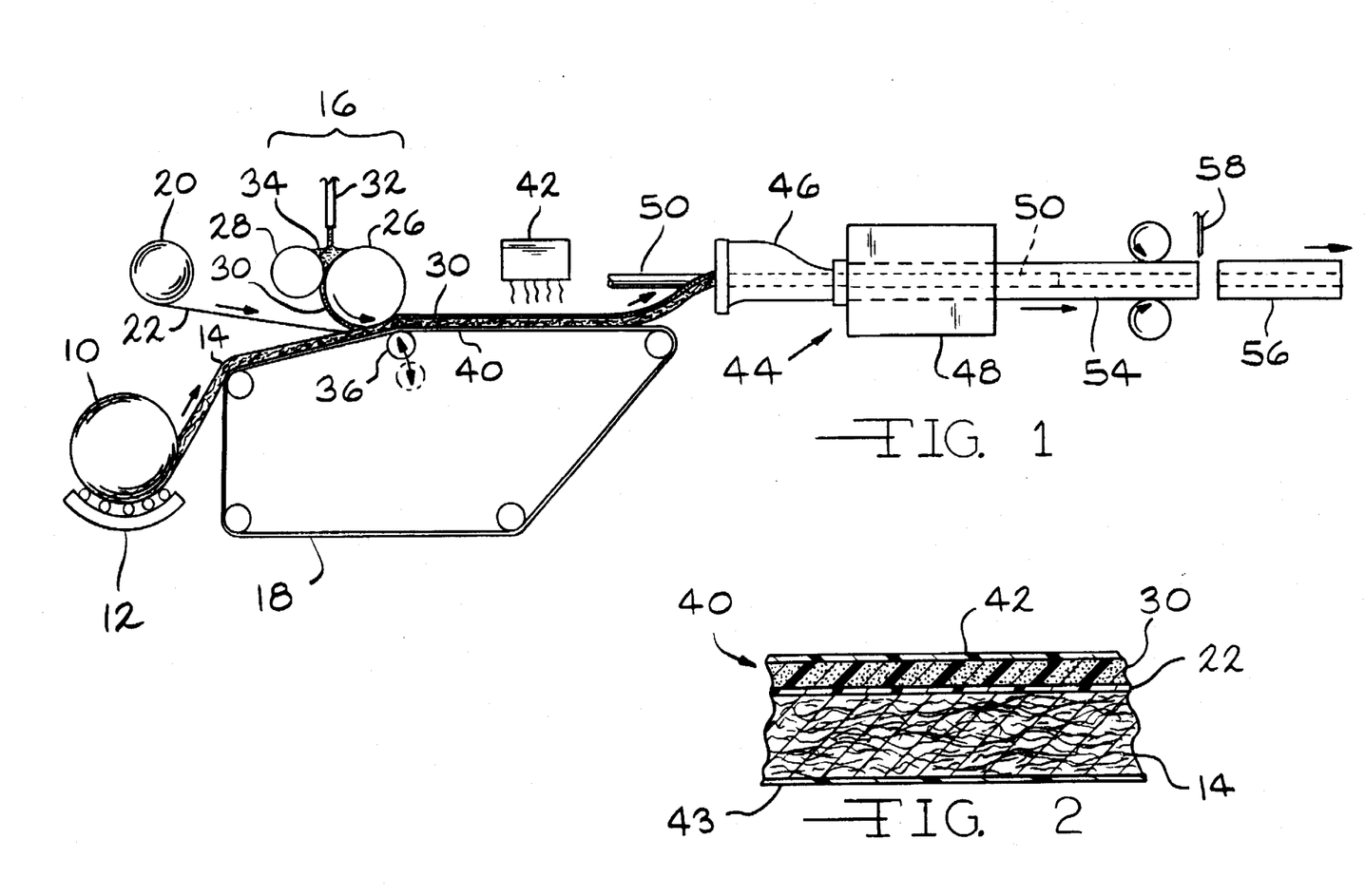
FIG. 1 is a schematic view in elevation of the apparatus for carrying out the method of forming an insulation product according to the method of the invention.
FIG. 2 is a schematic cross-sectional view in elevation of the laminated insulation material formed during the method of the invention.

Referring now to the drawings, FIG. 1 illustrates apparatus for producing an insulation product according to the method of the invention. The apparatus includes a roll 10 of fibrous insulation material, preferably in the form of a blanket. The insulation roll can be supported or mounted in any suitable manner, such as by a cradle 12, for being payed out as an insulation layer 14. The insulation layer is transported past an applicator station, indicated generally at 16, by applicator conveyor 18. Any means for moving the insulation layer can be used. Typical line speeds for the applicator conveyor are about 50 ft/min. (about 15 m/min).

The insulation material can be any fibrous material suitable for absorbing sound energy. For purposes of illustration the fibrous insulation material in the insulation layer is shown as being made of glass fibers. It is to be understood that other fibers can be used in the method of the invention. Such fibers as organic fibers and other types of mineral fibers can be used. In automotive sound insulation applications, for example, the preferred insulation fibers may be polyester fibers or polypropylene fibers. Typically, the insulation material has between about 5% and about 25% by weight of a phenolic resin binder such as urea phenol formaldehyde. The binder bonds the fibers together. It can be appreciated that the method of the invention, which relies primarily on the rigidity of the asphalt layer, enables molding media to be made with a considerably lesser amount of binder, and thus has operating efficiency and equipment cleanup benefits over processes using insulation blankets with higher percentages of binder material.

Preferably the fiberglass insulating material has a relatively low density between about 0.4 pounds per cubic foot (6.4 kg/m$^3$) and about 12 pounds per cubic foot (192 kg/m$^3$), more preferably between about 0.5 pounds per cubic foot (8 kg/m$^3$) and about 3 pounds per cubic foot (48 kg/m$^3$). The glass fibers in the insulating material preferably have an average diameter between about 3 and about 25 microns, and more preferably between about 3 and about 12 microns. The fiber diameter and density of the glass fiber blanket can be varied to modify the sound absorption characteristics of the insulation layer. Fiberglass insulating materials of the types described are commercially available from Owens Corning, Toledo, Ohio. The fibers can be formed into a cohesive blanket by several commonly known techniques, including subjecting the glass fibers to needle punching, and adding a binder to the glass fibers.

A roll 20 of a retention layer or veil 22, such as a spun bonded polyester fiber retention veil, is mounted to deliver the veil 22 into contact with the insulation layer 14. The purpose of the retention veil is to hold down the upper strata of fibers in the insulation layer as it passes the applicator station 16, thereby preventing the insulation layer from delaminating. The veil 22 also has the added benefit of acting as a reinforcement material for the insulation product. The applicator station is comprised of a coating roller or applicator roll 26 and a coater gap roller 28 which together form a gap through which a thin layer 30 of viscous, hardenable liquid, such as asphalt, passes. The asphalt can be supplied in molten form as a stream 32 from a source, not shown, and can be accumulated as a pool 34 of molten asphalt above the gap. The applicator roll can be heated to maintain the asphalt at the correct temperature for operation of the process. The application temperature of the asphalt is preferably within the range of from about 200° F. to about 475° F. (about 93° C. to about 246° C.). A lift roller 36, or any other suitable means, can be used to cause an increase in the angle of wrap of the retention veil and the insulation layer so that complete contact is made with the applicator roll 26. As shown, the lift roller can be mounted for movement to change the angle of wrap and the compression of the insulation. A typical insulation layer might be a ⅝ inch (1.6 cm) thick fiberglass blanket of the type usually used for heating and ventilating applications. The thickness of the asphalt layer depends on the product requirements. Thin asphalt layers are within the range of from about 1 mil to about 6 mils (about 0.025 mm to about 0.15 mm), but the thickness can be up to about 125 mils (3.125 mm). A typical asphalt layer might have a thickness of about 0.035 inches (about 0.89 mm).

Although the hardenable liquid is disclosed above as being molten asphalt, numerous other thermoplastic materials could also be applied to the insulation layer to bond the insulation product together and to provide a solid barrier against sound transmission through the product. For example, the hardenable liquid could be a wax, or a thermoplastic adhesive such as a hot melt polymeric material. Preferably, the thermoplastic material is at least 50 percent by weight asphalt, and preferably at least 70 percent by weight asphalt, exclusive of filler materials.

As the molten asphalt 30 comes into contact with the fiberglass insulation layer 14, it is desirable for the viscosity of the molten asphalt to be high enough so that the asphalt will saturate the veil, but will penetrate only minimally into the upper strata or layers of the insulation layer. Preferably, the viscosity of the molten asphalt is within the range of from about 500 to about 100,000 centipoise, and most preferably the viscosity is about 2000 centipoise. The viscosity is measured in the center of the pool 34 of asphalt at a temperature of 400° F. (204° C.). It can be appreciated that the molten asphalt is a liquid which will quickly cool and harden once it is formed into a thin layer 30 and once it contacts the insulation layer. For an acoustical product the asphalt is applied at a rate within the range of from about 0.1 to about 1 lb/ft$^2$ (about 0.49 to about 4.8 kg/m$^2$), and preferably at a rate of about 0.3 lb/ft$^2$ (about 1.5 kg/m$^2$). The amount of asphalt in other products will depend on the product requirements. The density of the asphalt is preferably within the range of from about 40 to about 80 pounds per ft$^3$ (about 640 to about 1,280 kg per m$^3$), and more preferably within the range of from about 50 to about 70 pounds per ft$^3$ (about 800 to about 1,120 kg per m$^3$).

The type of asphalt used in the asphalt layer 30 is not critical. The asphalt can be any bituminous material such as tars, pitches or asphalts. The asphalt can be any natural or petroleum derived asphalt. The common source of asphalt is the residue or bottoms from the petroleum refining industry which includes those commonly referred to as paving grade, roofer's flux, propane washed and air-blown. Typically, the asphalt will have a penetration ratio at 77° F. of 14, and a ring and ball softening point within the range of from about 180° F. to about 300° F. (82° to 149° C.).

The asphalt can optionally be modified with a polymer to give it improved flexibility during handling, and improved resistance to flow to prevent changes in thickness from top to bottom in the sound screen. A preferred polymer is a styrene/butadiene copolymer such as Kraton 1101 (20% styrene, 75% butadiene) from Shell Co., Houston, Tex. The weight ratio of asphalt to polymer is preferably between about 6:1 and about 20:1. The polymer can be mixed into the asphalt under high shear at 300° F. (149° C.) to 400° F. (204° C.).

Another preferred polymer is formed by copolymerization of SBS thermoplastic rubber and styrene monomer. Such a polymer is described in more detail in U.S. Pat. No. 4,273,685 to Marzocchi et al., issued Jun. 16, 1981, and U.S. Pat. No. 4,333,866 to Uffner, issued Jun. 8, 1982.

Other polymers that may be useful as asphalt modifiers include ethylene copolymers such as Elvax® 450 (ethylene vinyl acetate copolymer) or Elvaloy® AM (ethylene butylacrylate glycidyl methacrylate terpolymer) both made by Du Pont (Wilmington, Del.). Other polymers include polybutadiene or polypropylene.

Various fillers can be incorporated into the asphalt layer 30 to increase the mass of the layer and thus reduce the amount of sound transmitted through the sound reflecting barrier. Preferably the filler is selected from calcium carbonate, calcium oxide, clay, glass, mica, barium, and mixtures thereof. More preferably the filler is calcium carbonate because it is inexpensive and contributes significant mass. Additives can also be incorporated into the asphalt layer 30 to provide it with additional properties such as fire retardancy. The type and amount of filler can affect the flexibility of the product. The filler and the asphalt combination should be relatively easy to cut so that the product can be easily fabricated. Typically, the filler material is within the range of from about 40 to about 70 percent by weight of the total filled asphalt material.

The retention veil 22 can be any film or web, such as a fiberglass mat, suitable for holding down the upper strata of the insulation layer. It can be can be woven or nonwoven. Preferably the veil has a tensile strength greater than about 3 lbs/inch width (greater than about 0.54 kg/cm width). The retention veil must be porous or perforated, preferably having a Frasier air permeability within the range of from about 300 to about 1500 cubic feet/minute per $Ft^2$ (about 5,490 to about 27,450 $m^3$/hr per $m^2$), and most preferably a Frasier air permeability within the range of from about 800 to about 1000 cubic feet/minute per $ft^2$ (about 14,640 to about 18,300 $m^3$/hr per $m^2$). The retention veil is preferably a spunbonded polyester porous web, having a weight within the range of from about 0.75 to about 1.0 oz. per $yd^2$ (about 25 to about 34 $g/m^2$). Preferred retention veils are Remay spunbonded polyester veils Nos. 2011 and 2014 from Remay, Inc., Old Hickory, Tenn. The retention veil must have a service temperature higher than the temperature of the molten asphalt. If, for example, the asphalt is to be applied at a temperature of about 400° F. (204° C.), then the retention veil should have a service temperature of at least 450° F. (232° C.). A polypropylene porous veil could be used, but since polypropylene has a relatively low service temperature, a relatively cool asphalt must be used. The retention veil 22 can be a polyester film that has been perforated to render it porous to the liquid, hardenable asphalt, and yet is capable of holding down the fiberglass insulation layer and preventing it from delaminating during the asphalt application process. During application of the asphalt the retention veil 22 compresses the insulation layer 14, thereby making the application process easier and assuring complete contact between the asphalt layer 30 and the insulation blanket. Typically, during the application of the asphalt the insulation layer is compressed to a thickness within the range of from about 0.5 to about 0.1 times the uncompressed thickness of the insulation layer.

The result of applying the asphalt layer to the blanket of glass fiber insulation material is the laminated insulation material 40. As shown in FIG. 2, the laminated insulation material 40 may also include a release paper 42 to prevent undesirable adhesion of the laminated insulation material prior to its intended use. The release paper can be any film or paper suitable for preventing sticking, such as a wax or silicone treated paper. The insulation product can also have a backing layer 43, such as a pliable plastic facing. For some product applications, a polyester backing layer 43 can be used to cover the fiberglass blanket to avoid the potential for irritation upon handling of the product. The reinforcement layer or retention veil 22 may be positioned at the boundary between the asphalt and the fiberglass blanket, as shown, or may be embedded within the asphalt layer. A second insulation layer and a second asphalt layer, both not shown, can be applied on top of the asphalt layer 30 to form a multi-layered insulation product having two layers of fibrous insulation.

After the laminated insulation material 40 is formed, it can be rolled up into rolls for later use in a molding process. Also, the laminated insulation material can be chopped into pieces or blanks, not shown, and stored or shipped to a different location for molding. As shown in FIG. 1, the laminated insulation material can also be continuously molded into an insulation product, such as pipe insulation. The laminated insulation material is passed under a heater 42 which maintains the temperature of the layer of asphalt 30 high enough that the asphalt is softened. This will maintain the laminated insulation material in a flexible, moldable condition. The heater can be of any suitable type, such as a blower with hot gases, a radiant heater, or a hot plate.

The laminated insulation material 40 is then directed into a mold 44, which is comprised of a folding shoe 46 and shaper 48. The folding shoe directs the laminated insulation material into the mold and guides it into the shape of the continuous shaper 48. The temperature of the asphalt for molding is preferably within the range of from about 350° F. to about 375° F. (about 177° C. to about 191° C.), and at those temperatures the asphalt will preferably have a viscosity within the range of from about 500 to about 300 cps. Since the product shown being formed in FIG. 1 is pipe insulation, the mold includes a stationary mandrel 50 for maintaining the hollow center of the product. The shaper maintains the laminated insulation material in the desired shape. After the laminated insulation material 40 has been molded, a continuous hollow molded insulation 54 is formed. This can be cut into lengths of a pipe insulation product 56 by any suitable means, such as saw 58. Heat may be applied to the laminated insulation material in the shaper with any suitable means to maintain the asphalt in a flexible, moldable condition, but the laminated insulation material must eventually be cooled to enable the asphalt layer to be stiff enough to provide rigidity to the insulation product 56 formed from the molding process.

An important aspect of the method of the invention is the step of heating the laminated insulation material to soften the asphalt layer so that the asphalt can be molded. In some situations the asphalt might be applied at a very hot temperature, and the molding might take place immediately after the laminated insulation material is formed, so that an additional heating step is not needed prior to molding. In these situations, the heating step is considered to be performed by the step of applying the molten asphalt.

Figure 3:
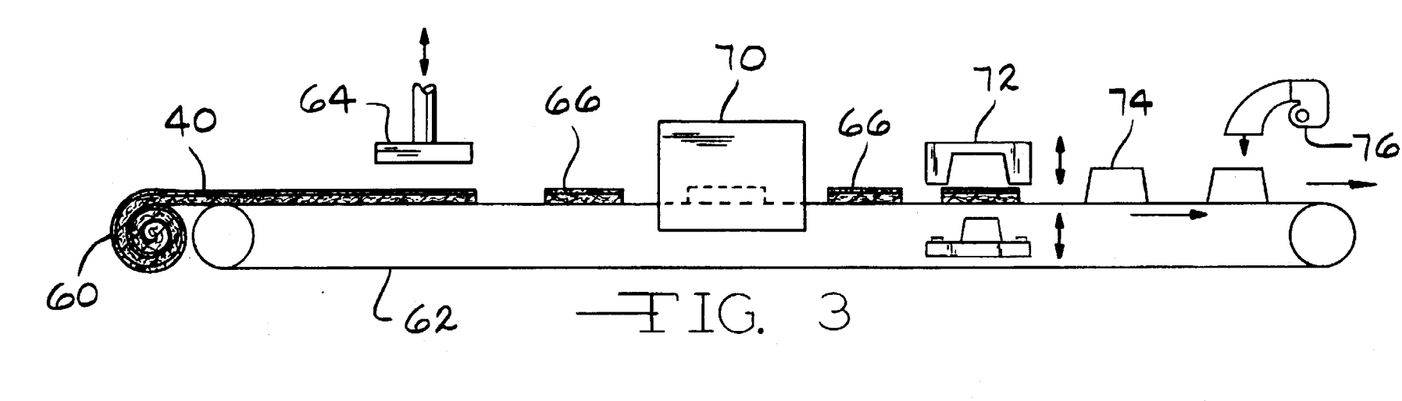
FIG. 3 is a schematic view in elevation of apparatus for molding the laminated insulation material according to the method of the invention.
Figure 4:
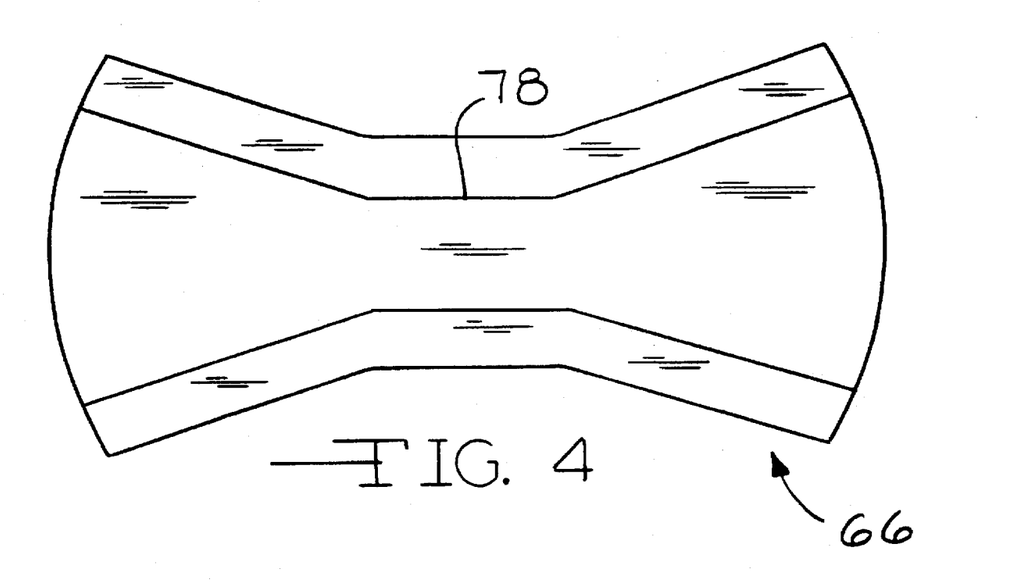
FIG. 4 is a schematic plan view of an insulation blank formed from the laminated insulation material.

As shown in FIG. 3, the molding process can also be carried out by molding the laminated insulation material 40 in an off-line process. The laminated insulation material 40 can be payed out from a supply roll 60 and carried along by a conveyor 62. Then, the laminated insulation material 40 can be cut by any suitable cutter 64 into blanks 66 for molding. Dies and water jets can alternatively be used. A typical blank is shown in FIG. 4. The blanks are passed through radiant oven 70 to heat the laminated insulation material so that the asphalt layer 30 will soften and become flexible for molding.

The heated blanks are then molded in a mold 72 to produce a molded insulation product 74. The mold can be manually fed or automatically fed. The mold can be provided with a source of heat, or can be operated at room temperature. After the molding step, the molded product can be cooled, either by contact with the air, or with the aid of a cooling apparatus, such as cooling fan 76. The cooling of the product assures that the asphalt will maintain the molded shape and thereby provide the necessary rigidity and structure to the insulation product. The insulation product may then optionally be trimmed.

Since the rigidity and backbone of the insulation product 74 is dependent on the hardened thermoplastic, i.e., asphalt, layer, there is no dependence on the binder in the fibrous blanket 14 to provide a major part of the structural support for the product. Consequently, the blanket 14 of fibrous material can contain a significantly lower amount of binder than would be possible in conventional molded products. A typical amount of binder in the fibrous layer 14 would be from 2 to about 7 percent by weight of the total fibrous layer. It is to be understood that the fibrous layer can be completely binderless, although a small amount of binder may be desirable to hold the insulation layer 14 together.

Figure 5:
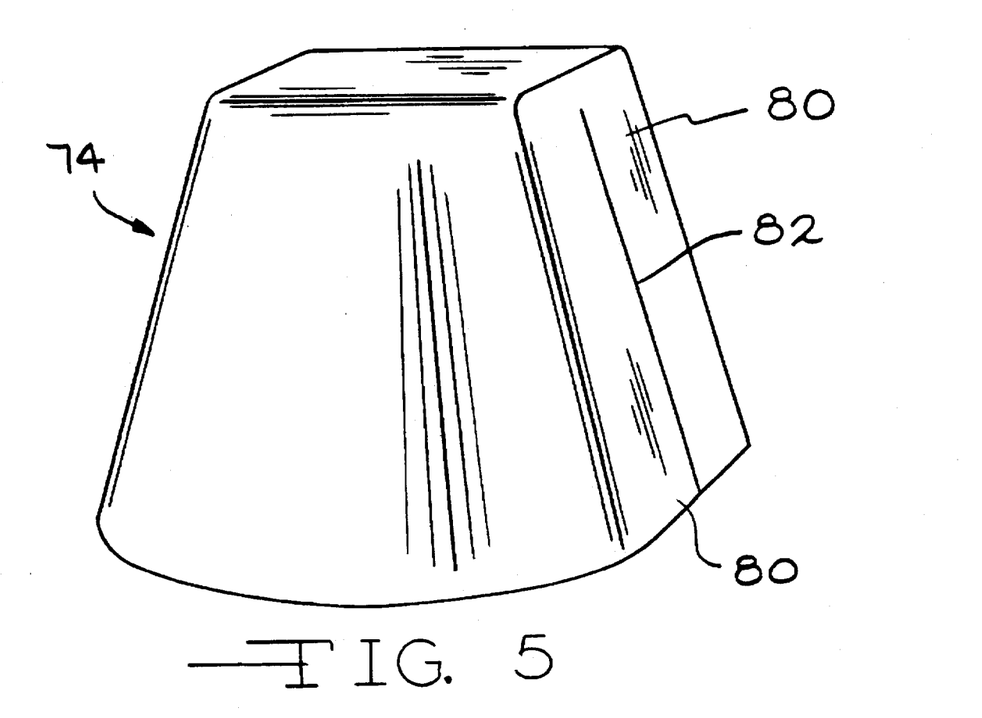
FIG. 5 is a schematic view in perspective of the insulation product of FIG. 4, shown after molding.

As shown in FIGS. 4 and 5, the insulation blank can be molded from blank 66 into a molded insulation product, such as air conditioner compressor cover 74. It should be noted that an insulation product similar to air conditioner compressor cover 74 is disclosed in U.S. patent application Ser. No. 08/706,149, filed Aug. 30, 1996, which application is hereby incorporated herein in its entirety. The blank can be folded prior to the molding step along fold lines 78 to form end panels 80 which contains a seam 82. It is to be understood that the insulation product can be of any shape desired for providing acoustical or thermal insulation for the article to be insulated.

Figure 6:
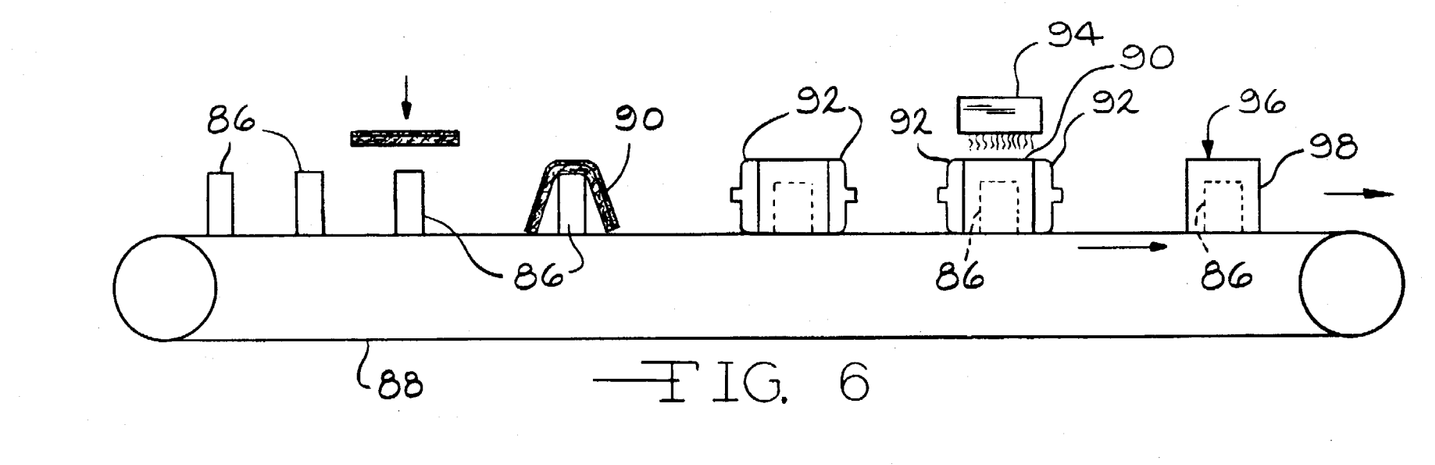
FIG. 6 is a schematic view in elevation of apparatus for conforming and molding the laminated insulation material around an article to be insulated.

As shown in FIG. 6, which illustrates a method of directly forming a blank around an article to be insulated, the article 86 to be insulated can be conveyed by a conveyor 88. Insulation blanks 90, comprised of laminated insulation material having a layer of thermoplastic material such as asphalt bonded to a layer of fibrous glass insulation, are placed on the articles and formed or molded into close conformance with the contour of the articles by any suitable clamping or pressing means, such as press 92. While held in the ultimately desired shape by the press, heat is applied in any suitable manner, such as by a radiant heater 94. The heat softens the layer of asphalt in the laminated insulation material and after cooling, the final product 96 is comprised of the article 86 and the insulation cover or product 98 made by the method of the invention. The final product 96 may optionally be trimmed.

Although the asphalt layer 30 is shown in FIG. 1 as being applied in a molten form to the fiberglass insulation layer 14, the asphalt layer can be added to or applied to the fiberglass layer in a solid, unmelted form, and other means for laminating the asphalt layer to the fibrous insulation layer, such as an adhesive, can be used.

Figure 7:
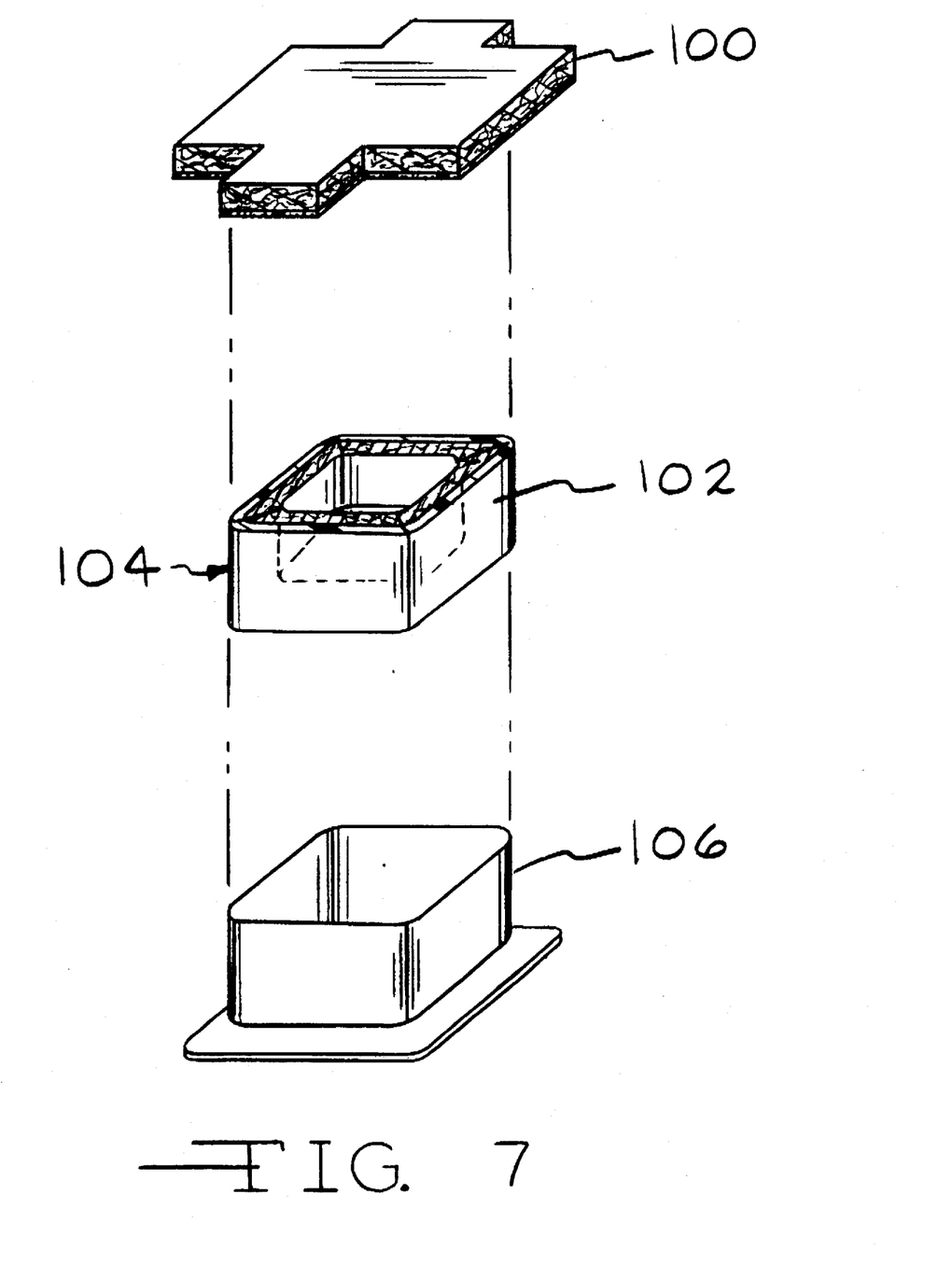
FIG. 7 is a schematic view in perspective of the method of forming the insulation product of the invention by positioning the laminated insulation material into contact with an article to be insulated.

The method of the invention can include forming an insulation product of the invention by positioning the laminated insulation material into contact with an article to be insulated. As shown in FIG. 7, a glass fiber blank 100 can be coated with softened or molten thermoplastic material such as asphalt 102 and folded into the desired shape, thereby forming a laminated insulation material 104. Alternatively, the blank could be folded into the desired shape, and then coated with the softened or molted asphalt material. Then the laminated insulation material 104 can be cold molded by applying it to the inner surface of an article to be insulated, such as air conditioner compressor cover 106. The softened asphalt layer 102 is pliable and allows the laminated insulation material to conform to the contour of the compressor cover. After cooling, the insulation product will be adhered to the compressor cover, and the product will be made rigid by the cooled asphalt layer. The insulation product may then be optionally trimmed. The insulation product formed on the interior of the air conditioner compressor cover provides acoustical insulation. It is to be understood that the process could include a step of heating the laminated insulation material to soften the asphalt layer.

The principle and mode of operation of this invention have been described in its preferred embodiment. However, it should be noted that this invention may be practiced otherwise than as specifically illustrated and described without departing from its scope.

What is claimed is:

1. A method of forming an insulation product comprising:
   heating a thermoplastic material to a softened condition;
   applying a layer of reinforcement material to a blanket of fibrous insulation material;
   applying the thermoplastic material to the layer of reinforcement material and the blanket of insulation material to form a laminated insulation material comprising a layer of the thermoplastic material bonded to the layer of reinforcement material and the blanket of insulation material, wherein the viscosity of the thermoplastic material is established so that some of the thermoplastic material passes through the layer of reinforcement material and penetrates only minimally into the blanket of insulation material;
   heating the laminated insulation material to soften the layer of thermoplastic material to form a heated laminated insulation material which is more flexible;
   molding the heated laminated insulation material to form the laminated insulation material into a desired shape; and
   cooling the molded laminated insulation material to form an insulation product.

2. The method of claim 1 in which the thermoplastic material is at least 50 percent by weight asphalt, exclusive of filler materials.

3. The method of claim 1 in which the step of molding the laminated insulation material is carried out in a mold.

4. The method of claim 1 in which the density of the insulation material in the insulation product is within the range of from about 0.4 to about 12 pounds per ft$^3$ (about 6.4 to about 192 kg per m$^3$), and the density of the thermoplastic material in the insulation product is within the range of from about 40 to about 100 pounds per ft$^3$ (about 640 to about 1,600 kg per m$^3$).

5. The method of claim 1 in which the density of the insulation material in the insulation product is within the range of from about 0.5 to about 3 pounds per ft$^3$ (about 8 to about 48 kg per m$^3$), and the density of the thermoplastic material in the insulation product is within the range of from about 50 to about 70 pounds per ft$^3$ (about 800 to about 1,120 kg per m$^3$).

6. The method of claim 1 in which the thickness of the thermoplastic material is within the range of from about 1 mil to about 6 mils (about 0.025 mm to about 0.15 mm).

7. The method of claim 1 including cooling the laminated insulation material prior to the step of heating the laminated insulation material.

8. The method of forming an insulation product comprising:
   heating an asphalt material to a softened condition;
   applying a layer of reinforcement material to a blanket of insulation material of mineral fibers;
   applying the asphalt material to the layer of reinforcement material and the blanket of insulation material to form a laminated insulation material comprising a layer of the asphalt material bonded to the layer of reinforcement material and the blanket of insulation material, wherein the viscosity of the asphalt material is established so that some of the asphalt material passes through the layer of reinforcement material and penetrates only minimally into the blanket of insulation material;

heating the laminated insulation material to soften the layer of asphalt material to form a heated laminated insulation material which is more flexible;

molding the heated laminated insulation material to form the laminated insulation material into a desired shape; and cooling the molded laminated insulation material to form an insulation product.

9. The method of claim 8 in which the asphalt material is at least 70 percent by weight asphalt, exclusive of filler materials.

10. The method of claim 8 in which the density of the insulation material in the insulation product is within the range of from about 0.5 to about 3 pounds per ft$^3$ (about 9.6 to about 48 kg per m$^3$), and the density of the thermoplastic material in the insulation product is within the range of from about 50 to about 70 pounds per ft$^3$ (about 800 to about 1,120 kg per m$^3$).

11. The method of claim 8 in which the thickness of the asphalt layer in the insulation product is less than about 125 mils (about 3.125 mm).

12. The method of claim 8 in which the molded shape of the laminated insulation material is a nonplanar shape.

13. The method of claim 8 including cooling the laminated insulation material prior to the heating step.

14. A method of forming an insulation product comprising:

heating a thermoplastic material to a softened condition;

applying the thermoplastic material to a blanket of fibrous insulation material to form a laminated insulation material comprising a layer of the thermoplastic material bonded to the fibrous insulation material;

heating the laminated insulation material to soften the layer of thermoplastic material, thereby making the laminated insulation material more flexible;

molding the laminated insulation material to forth the laminated insulation material into a desired shape, by positioning the laminated insulation material in contact with an article to be insulated and by conforming the laminated insulation material to the shape of the article; and cooling the molded laminated insulation material to for an insulation product.

15. The method of claim 14 in which the thermoplastic material is at least 50 percent by weight asphalt, exclusive of filler materials.

16. The method of claim 14 in which the density of the insulation material in the insulation product is within the range of from about 0.4 to about 12 pounds per ft$^3$ (about 6.4 to about 192 kg per m$^3$), and the density of the thermoplastic material in the insulation product is within the range of from about 40 to about 100 pounds per ft$^3$ (about 640 to about 1,600 kg per m$^3$).

17. The method of claim 24 in which the insulation material comprises mineral fibers.

18. The method of claim 14 in which the thickness of the thermoplastic material is within the range of from about 1 mil to about 6 mils (about 0.025 mm to about 0.15 mm).

* * * * *

UNITED STATES PATENT AND TRADEMARK OFFICE
CERTIFICATE OF CORRECTION

PATENT NO. : 5,743,985
DATED : April 28, 1998
INVENTOR(S) : Frederick R. Ernest; Jeffrey J. Van Sloun; Charles R. Weir It is certified that error appears in the above-identified patent and that said Letters Patent is hereby corrected as shown below:

In the claims:

In Claim 14, line 11; delete forth and insert --form--.

In Claim 14, line 17; delete for and insert --form--.

In Claim 17, line 1; delete 24 and insert --16--.

Signed and Sealed this

First Day of September, 1998

Attest:

BRUCE LEHMAN

Attesting Officer

Commissioner of Patents and Trademarks